United States Patent [19]

Scanley

[11] 4,052,353

[45] Oct. 4, 1977

[54] DISPERSIONS OF WATER SOLUBLE POLYMERS IN OIL

[76] Inventor: Clyde S. Scanley, 330 Speedwell Ave., Morristown, N.J. 07960

[21] Appl. No.: 613,231

[22] Filed: Sept. 15, 1975

Related U.S. Application Data

[63] Continuation-in-part of Ser. No. 429,548, Jan. 2, 1974, abandoned.

[51] Int. Cl.² .............................................. C08F 2/32
[52] U.S. Cl. .................. 260/29.6 PM; 260/29.6 HN;
                              260/29.6 WQ; 260/33.2 R; 260/33.6 UA
[58] Field of Search ............. 260/29.6 PM, 29.6 WQ,
                                    260/33.6 UA, 33.2 R, 29.6 HN

[56] References Cited

U.S. PATENT DOCUMENTS

| 3,826,771 | 7/1974 | Anderson et al. | 260/29.6 WQ |
| 3,849,361 | 11/1974 | Zweigle | 260/33.2 R |
| 3,957,739 | 5/1976 | Cabestany et al. | 260/29.6 WQ |

FOREIGN PATENT DOCUMENTS 1,277,577  6/1972  United Kingdom

*Primary Examiner*—Eugene C. Rzucidlo
*Attorney, Agent, or Firm*—Marn & Jangarathis

[57] ABSTRACT

Water soluble polymers dispersed in a water-in-oil emulsion are treated to reduce the water content thereof to provide a polymer dispersed in oil which is stable to coagulation or agglomeration during subsequent treatment. The composition can be chemically modified and/or made self dissolving in water by addition of surfactant without polymer agglomeration.

8 Claims, No Drawings

DISPERSIONS OF WATER SOLUBLE POLYMERS IN OIL

This application is a continuation-in-part of U.S. application Ser. No. 429,548 filed on Jan. 2, 1974 and now abandoned.

This invention relates to finely divided water soluble polymers dispersed in oils. More particularly, the present invention relates to stabilization of water in oil emulsions having finely divided polymer dispersed therein and to subsequent treatment thereof and uses therefor. The invention further relates to the production of water soluble condensation products.

Water in oil emulsions having finely divided water soluble polymers dispersed therein are known in the art. The primary disadvantage of such emulsions is that attempts to further treat such emulsions generally result in coagulation or agglomeration of the polymer whereby the polymer does not remain finely divided and dispersed in the emulsion.

Thus, for example, attempts to add surfactant to such emulsions to render the emulsions self inverting, whereby the polymer can be dispersed in aqueous solutions, have generally not been successful as a result of coagulation or agglomeration of the polymer. As a result, in general, such emulsions are inverted into water by separately adding the surfactant and emulsion to the water, which necessitates separate shipping and handling of two products.

In U.S. Pat. Nos. 3,624,019 and 3,734,873, it is indicated that it is possible, in some cases, to prepare a self inverting water-in-oil emulsion having finely divided polymer and surfactant dispersed therein; however, such patents indicate that there are severe limitations in that the addition of the surfactants may tend to interact with the emulsifier or emulsion and destroy it prior to use thereof.

Accordingly, there is a need for water soluble polymers dispersed in oil, which are more stable.

It is further known in the art to chemically modify various polymers, such as for example, acrylamide polymers by hydrolysis, aminomethylation, etc. Numerous difficulties have been encountered, in effecting such modifications, in particular modification of polymers having high molecular weights, as a result of the viscous nature thereof. Such problems, include, pumping problems, problems in uniform mixing of reagents to produce uniform reaction; problems in transmitting heat without local overheating, etc.

Accordingly, there is a need for improved means of chemically modifying various polymers.

It is also known in the art to produce condensation polymer; however, in order to mitigate the problems associated with the viscous nature of the reaction mixture, it is necessary to effect such polymerizations at low polymer concentrations. In addition, in some cases, it may be necessary to limit the molecular weight of the polymer.

Accordingly, there is a need for improvements in the technique for producing water soluble condensation polymers.

In accordance with one aspect of the present invention, there is provided a self-dissolving composition of finely divided polymer and surfactant dispersed in oil in which the water content of the composition is at a value at which the polymer remains finely divided and dispersed in the oil.

In accordance with yet a further aspect of the present invention, a self dissolving composition of finely divided water soluble polymer dispersed in oil is produced by providing a water in oil emulsion having finely divided water soluble polymer dispersed therein, reducing the water content of the emulsion to a value at which the polymer remains finely divided and dispersed in the oil upon addition of a surfactant to render the composition self dissolving.

In yet another aspect of the present invention, a water soluble polymer is chemically modified by forming a water in oil emulsion having finely divided water soluble polymer dispersed therein, reducing the water content of the emulsion to a value at which the polymer remains finely divided and dispersed in the oil during the chemical modification and chemically modifying the polymer.

In still a further aspect of the present invention, a water soluble condensation polymer is produced by effecting condensation polymerization of monomers in a water in oil emulsion.

In yet another aspect of the present invention, an acrylamide polymer is hydrolyzed by the use of ammonia.

The polymers used in the present invention are any one of the wide variety of water soluble vinyl addition polymers or water soluble condensation polymers. The term "water soluble" means that the polymer is soluble in water in an amount of at least 1%, by weight.

Water soluble vinyl addition polymers are well known in the art, and such polymers are preferably used in producing the self dissolving compositions in accordance with the present invention. The most preferred vinyl addition polymers are polymers (the term polymer as used herein refers to both homopolymers and copolymers containing two or more monomeric units) of acrylamides, such as polyacrylamide and copolymers of acrylamide with acrylic acid or salts thereof which contain from 5 to 95 weight percent of acrylamide. Also suitable are copolymers of acrylamide with maleic anhydride, vinyl benzene, acrylonitrile, styrene, methacrylamide, etc.

As representative examples of other suitable water soluble vinyl addition polymers, there may be mentioned water soluble polymers of acrylic acid, vinyl pyridines, vinyl benzyl dimethyl ammonium chloride, methacrylamide, sulfonates of acrylic esters, such as 2-sulfoethyl acrylate, styrene sulfonates, quaternary or amino substituted acrylic and methacrylic esters, such as 2-aminoethyl methacrylate, and the like.

As representative examples of water soluble condensation polymers which are useful in preparing the emulsions of the present invention or which can be prepared by the emulsion technique of the present invention, there may be mentioned, the polyamines, produced by condensation of difunctional amine with an epihalohydrin and/or alkyl dihalide.

The polymers used in preparing the emulsion of the present invention may have a molecular weight over a wide range; e.g., 10,000 – 25,000,000; however, the present invention is particularly applicable to high molecular weight polymers; i.e., in excess of 100,000, in that such polymers are more difficult to subject to further treatment, such as by chemical modification and/or rendering same readily soluble in water.

The oils which are used in preparing the emulsions of the present invention may be any one of a wide variety of oils which do not adversely affect the polymer to be dispersed in the oil. The oil may be any one of a wide variety of liquids which are immiscible with water including hydrocarbons and substituted hydrocarbons. As representative examples, there may be mentioned benzene, xylene, toluene, mineral oils, kerosenes, naphthas, chlorinated hydrocarbons, such as perchloroethylene, etc. A blend of organics can be used in preparing the oil phase. The oil phase preferably has a boiling point in excess of 100° C to avoid excess loss of oil phase during water removal; however, lower boiling materials can be used, provided the oil phase is replenished during water removal.

The water in oil emulsion having finely divided water soluble polymer dispersed therein may be prepared by any one of a wide variety of procedures, and is preferably prepared by the water in oil emulsion polymerization technique for preparation of vinyl addition polymers. In accordance with such a procedure, a water in oil emulsion of water soluble ethylenically unsaturated monomer(s) is formed and polymerized under free radical polymerization conditions to produce a latex of water in oil emulsion having finely divided polymer dispersed therein. A representative example of this technique is disclosed in U.S. Pat. No. 3,284,393, hereby incorporated by reference.

Alternatively, and less preferred, the water in oil emulsions having finely divided water soluble polymer dispersed therein can be prepared by dispersing previously prepared polymer in a water in oil emulsion. Such techniques are known in the art and need not be set forth in detail for a complete understanding of the present invention. In brief, such techniques involve comminuting the polymer to provide finely divided polymer (average particle size is generally less than 5 millimeter) and then dispersing the polymer in a water in oil emulsion by means of suitable agitation. In most cases, a suitable oil soluble emulsifying agent is used in preparing the emulsion. The emulsifier should be inert with respect to the components present in the emulsion or used in the subsequent treatment. In general, the better emulsifiers have HLB numbers (Hydrophobic-lipophobic balance) of below 9 and preferably below 7.

The above techniques and other techniques for producing such emulsions are known in the art and no further details are deemed necessary for a complete understanding of the invention.

The water in oil emulsions having finely divided water soluble polymer dispersed therein, which are stabilized to polymer agglomeration, in accordance with the present invention, generally contains from 50% to 95%, by weight, water, and most generally from 60-80% water, based on polymer and water. The amount of oil phase present in the emulsion is generally in the order of 25 to 75 weight percent, based on oil and water phases.

In accordance with the present invention, the water in oil emulsions having finely divided water soluble polymer dispersed therein are stabilized with respect to agglomeration or coagulation of polymer to permit subsequent treatment thereof, by reducing the water content thereof to a value at which the polymer remains finely divided and dispersed in the oil during subsequent treatment of the polymer dispersed in oil. It is to be understood that the term subsequent treatment is intended to cover further chemical treatment of the dispersed polymer and/or addition of components to the polymer dispersed in oil, which without stabilization by water removal, would normally cause coagulation or agglomeration of the polymer particles.

In accordance with the present invention, the water content of the water-polymer phase is reduced to less than about 40 percent, by weight, based on water and polymer. As should be apparent, the particular amounts of water which can be tolerated in order to provide the desired stabilization will vary with the polymers employed and the type of subsequent treatment. In general, the water content of the polymer and water phase is reduced to provide a water content in the order of 0% to 40%, by weight, based on polymer and water. In most cases, the water content of the polymer and water phase is reduced to an amount of no less than 1%, by weight, based on polymer and water, in that complete water removal is not readily achieved. The water content is preferably in the order of 1% to 30% and most preferably in the order of 1%, (in some cases 0%) to 15%, all by weight, based on polymer and water. In accordance with the aspect of the present invention wherein the polymer is to be further chemically modified, in most cases, the water content should be at least 5%, by weight, based on polymer and water, with the upper limits being as hereinabove described.

The selection of an optimum water content at which the polymer is stabilized with respect to agglomeration or coagulation during subsequent treatment is deemed to be within the scope of those skilled in the art from the teachings herein. It is noted, however, that lower water contents are required when using water soluble polymers containing substantial amounts of amines and/or emulsions which are to be stored over longer periods of time or stored at either high or low temperatures. Similarly, greater water removal is generally required for lower molecular weight polymers.

It is to be understood that in most cases, subsequent to the water removal step, the polymer is not present in the oil as an emulsion; i.e., the polymer is present as a suspension. It is to be understood, however, that the terminology that the water soluble polymer is finely divided and dispersed in the oil is not intended to be limited by technical definitions of emulsions, suspensions, etc., in that the present invention is directed to compositions in which the polymer remains finely divided and dispersed in the oil during subsequent treatment.

The water content of the emulsion is generally reduced by evaporation of water, preferably under vacuum. The evaporation is generally effected at temperatures from ambient to 100° C. The selection of an optimum temperature is deemed to be within the scope of those skilled in the art from the teachings herein. Prior to or during the water evaporation, additional inert organic liquid may be added for the purpose of reducing viscosity and/or replacing oil distilled from the emulsion during water removal.

There are variations in the coagulating tendency of various latices and the more sensitive the latex, the lower should be the temperature at which evaporation of water is carried out. Preferably below 100° and more preferably below 70°.

As water is progressively removed, the temperature of evaporation may be raised higher without coagulation. For example, a preferred method of operation on a polymer may be to start at 40° C and go to 80° as evaporation procedes.

In accordance with the present invention, the hereinabove described technique may also be used for providing the polymers as finely divided solids, by evaporating both water and oil. Applicant has found that finely divided polymer can be recovered, without adverse agglomeration or coagulation, by evaporating water and oil, thereby providing a simple technique for recovering the solid polymer produced by a water in oil emulsion polymerization technique.

As hereinabove noted, in accordance with one aspect of the present invention, the dispersion of water soluble polymer in oil having a reduced water content, which renders the composition susceptible to further treatment without polymer coagulation, is subsequently treated by the addition of surfactant to provide a self-dissolving composition. It has been surprisingly found that any one of the wide variety of well known surfactants which would normally cause coagulation of the polymer dispersed in a water in oil emulsion, can be added to the composition of the present invention of polymer dispersed in oil of reduced water content, as hereinabove described, without effecting coagulation or agglomeration of the polymer. The surfactant added to the composition to render same self dissolving may be selected from any one of a wide variety of water soluble cationic, anionic or non-ionic surfactants known in the art. As known in the art, anionic surfactants include alkali metal, ammonium and amine soaps; salts of various sulfonic acids, sulfonated oils, etc.

Cationic surfactants include various long chain amines, quaternary salts, etc.

Non-ionic surfactants include condensation products of various alcohols, phenols and amides with ethylene oxide; polyethylene glycol esters, etc.

The surfactants are well known in the art and examples of such surfactants are disclosed in U.S. Pat. No. 3,624,019.

It has been found that in order to be effective the HLB of the surfactant should be above 8. In any case, the following relationship should obtain:

The resultant HLB of the following calculation should be preferably between $$\frac{\% \text{ of original emulsifier in oil} \times HLB \text{ of emulsifier}}{100} + \frac{\% \text{ of surfactant in oil} \times HLB \text{ of surfactant}}{100}$$

The self-dissolving compositions of the present invention includes surfactant in an amount to render the polymer self-dissolving in water. In general, the compositions contain from about 0.1% to about 20%, preferably from 1% to 15%, by weight, of surfactant based on oil. The water content is as hereinabove described, whereby the polymer is finely divided and dispersed in the oil after addition of the surfactant. It is to be understood that the present invention is not limited to such illustrative amounts of surfactant, and the determination of suitable amounts is deemed to be within the scope of those skilled in the art from the teachings herein. In general, the polymer is present in the oil in an amount from 5% to about 90%, preferably 25% to 75%, all by weight.

The self dissolving compositions of the present invention are preferably formed from water soluble ethylenically unsaturated addition polymers, and most preferably from polymers of acrylamides. The polymer is readily released into water from the composition by adding the self dissolving composition to water.

It is to be understood that additives other than surfactants can be added to the self inverting composition, without effecting coagulation or agglomeration of the polymer. Thus, for example, in using the self dissolving compositions for water treatment purposes, it may be desirable to also add to the composition a biocide and/or corrosion inhibitor, etc., and such additives can be added with the surfactant. The self-dissolving compositions of the present invention are particularly suitable for use in water treatment compositions in a manner known in the art.

As hereinabove noted, in accordance with another aspect of the present invention, the composition of water soluble polymer dispersed in oil having a reduced water content can be subsequently treated, in the dispersed phase, to chemically modify the polymer, without coagulation or agglomeration of the polymer.

The present invention is particularly applicable to the following chemical modification of polymers of acrylamide and methacrylamide:

Hydrolysis of amide to carboxyl.
Dialkylaminomethylation of amide groups.
Sulfomethylation of amide.
Hoffman reaction with chlorine or bromine and base.
Exchange of amide nitrogen for nitrogen of N,N dimethylaminopropylamine.

The present invention is also applicable to the quaternization of amine containing polymers, and the alkylation of amines by halogen containing polymers, in particular, acrylamide copolymers in which the comonomer contains an amino or halo group, respectively. Thus, for example, a copolymer of acrylamide and dimethylaminoethyl methacrylate can be quaternized with methyl chloride or a copolymer of acrylamide with chloroethylmethacrylate can be quaternized with trimethylamine dispersed in oil and having a reduced water content.

The finely divided low water content polymer, dispersed in oil, (prepared as hereinabove decribed by either forming an emulsion by adding polymer to a water in oil emulsion or producing the polymer by polymerization in a water in oil emulsion; followed by reduction of the water content) has an average particle size generally in the order of 0.1 micron to 500 microns, and most frequently, 0.5 to 100 microns. Larger particle sizes could be used, but some of the advantages of the invention are decreased.

The chemical modifications can be effected by using the reagents and conditions generally known in the art, except that the polymer is treated dispersed in oil, with the water content of the polymer being as hereinabove described. Solid reagent employed in the chemical modification may be added as fine powders, aqueous solutions or pre-emulsified in the same manner as the latex. In some cases, pre-emulsification of the reagent may be required in order to prevent coagulation or agglomeration of the polymer. Liquid reagents can also be pre-emulsified.

The acrylamide polymer, as hereinabove noted, may be chemically modified with various known reagents, including, as representative examples, bases, dialkylamine and formaldehyde, sodium bisulfite and formaldehyde; N,N-dialkyldiamines, etc.

The chemical modification of acrylamide polymers may be effected at reaction temperatures known in the art, generally in the order of 15° to 130° C at atmospheric or elevated pressures. The above conditions are only illustrative, and the selection of suitable conditions is deemed to be within the scope of those skilled in the art.

In accordance with the present invention, it has been found that chemical modification of acrylamide polymers dispersed in oil, by hydrolysis can be effected with a suitable base, such as potassium hydroxide, sodium hydroxide or ammonia. The hydrolysis is generally effected at temperatures of 20° C to 130° C, preferably at a temperature of 50° to 100° C. It is to be understood that the present invention is not limited to such illustrative temperatures.

It has also been found in accordance with the present invention, that advantageous results are obtained by the use of ammonia or ammonium hydroxide, instead of other conventional bases, for the hydrolysis of acrylamide polymers, in particular, those having a molecular weight of at least 100,000. Thus, for example, improvement in neutralization of acrylamide polymers in aqueous media are obtained by the use of ammonia or ammonium hydroxide as a result of the ability to control hydrolysis more effectively.

In accordance with still another aspect of the present invention, water soluble condensation polymers, in particular, polyamines, are produced by polymerization in a water in oil emulsion. By proceeding in this manner, concentration of the polymer in the water phase can be increased to concentrations greater than those heretofore used in the art, without the disadvantages which would normally result from the presence of high polymer concentrations.

As known in the art, polyamines are produced by condensation of a polyfunctional amine, i.e., an amine capable of at least double alkylation, with an epihalohydrin or an alkyl dihalide.

As representative examples of suitable amines for the present invention, there may be mentioned: Methylamine, dimethylamine, ethylamine, ethanolamine, propylamine, N,N-dimethylethylenediamine, tetramethylethylenediamine, piperazine, ammonia, ethylenediamine, N-methylethylenediamine, the polyalkylenepolyamines including diethylenetriamine, tetraethylenepentamine and the corresponding polypropylenepolyamines, p-phenylenediamine, p,p'-bisaniline, and 1,3-diamino-2-propanol and aniline are suitable. The amines need not possess great water solubility, and the suitability of any particular amine as a raw material can be readily determined by laboratory trial. Mixtures of two or more bifunctional amines may be used.

The epihalohydrin used in this invention has the essential group

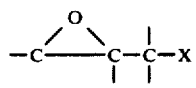

wherein the epoxy group is bonded to two carbon atoms, one of which is bonded adjacently to a carbon atom having the halogen bonded thereto. The halogen is preferably chlorine for reasons of availability and cost, but may be bromine or iodine. The indicated free valences on the carbon atoms are satisfied by hydrogen or lower alkyl groups, preferably the methyl or ethyl groups.

The epihalohydrin is preferably epichlorohydrin but may be epibromohydrin, epiiodohydrine, or one of the higher molecular weight vicinal halohydrins such as 3-chloro-1,2-epoxybutane, 3-chloro-1,2-epoxypentane, etc. Diepoxides such as butadiene diepoxide may also be used.

The alkyl dihalide used in the invention is preferably a dichloride or dibromide of lower alkanes (2-6 carbon atoms), with the halo groups preferably being on the terminal carbon atoms. As representative examples of suitable compounds, there may be mentioned: 1,2-dichloroethane, 1,2-dibromoethane, 1,3-dichloropropane, 1,3-dibromopropane, etc.

The selection of suitable amines for condensation with a dihaloalkane and/or epihalohydrin is deemed to be within the scope of those skilled in the art from the teachings herein.

The reaction is generally effected at temperatures known in the art; i.e., temperatures in the order of 0°-100° C. In addition, the reaction mixture, as known in the art preferably includes an acid acceptor; in particular, an alkali metal hydroxide.

The general conditions for producing polyamine condensation polymers are known in the art, and such teachings are applicable to the present invention.

In accordance with the present invention, the monomers are condensed in a water in oil emulsion, with the water phase, including monomer, generally comprising from 25% to 75%, by weight, of the emulsion, based on water and oil.

The water phase is present in an amount to provide a polymer water phase comprised of from 40% to 95%, of water, preferably 60 to 90%, all by weight, based on polymer and water. Subsequent to completion of the polymerization, water may be removed, as hereinabove described to provide more concentrated polymer in water solutions. The oil may also be removed, as hereinabove described to provide flowable compositions of polymers of concentrations higher than heretofore available in the art. Thus, for example, the oil content could be reduced to the order of 10% to 80%, preferably 15% to 70%, and most preferably 20% to 50%, of the total composition, by weight, which provides an improvement over the 10% polyamine solutions generally available in the art.

The monomers are emulsified in the oil phase by the use of a suitable water oil emulsifying agent. The emulsifier is generally present in an amount of from 0.1 to 10 percent, by weight, of the oil phase. The emulsifiers are well known in the art and no further details are deemed necessary in this respect for a complete understanding of the invention.

It is also to be understood that the polyamine could be produced by conventional techniques, followed by emulsification of the water polymer solution in oil and evaporation of the water to produce a more concentrated aqueous solution of polyamine.

The invention will be further described with respect to the following examples, but it is to be understood that the scope of the invention is not to be limited thereby.

EXAMPLE I

An acrylamide polymer known as Nalco 7171 is a high molecular weight polymer of the type described in U.S. Pat. No. 3,284,393, Vanderhoff. It is an emulsion comprising a continuous phase of hydrocarbon in which are suspended fine particles of polyacrylamide gel. The composition of Nalco 7171 is approximately as follows:

|  | % by weight |
|---|---|
| Polymer | 30 |
| Water | 38 |

| | % by weight |
|---|---|
| Hydrocarbon | 28 |
| Emulsifier | 4 |

A 20 gram sample of Nalco 7171 was weighed into a 2 ounce bottle followed by 4.3 grams of toluene. The bottle was then connected to a water aspirator and vacuum was applied. The bottle was held at 20° – 25° C with a water bath for 12 minutes, after which the temperature of the bath was raised to 40° C for 30 minutes and to 50° C for another 10 minutes. The bottle was disconnected and the product was found to weigh 13.7 grams (loss of 10.6 grams of water and hydrocarbon combined). A sample of the product was removed and designated Sample A. To the remainder of the product in the bottle (8.4 grams) was added 4.3 grams of toluene. Vacuum was then applied over a 20 minute period while the bath temperature was raised from 25° C to 80° C. Distillation was discontinued at this time and the remaining product was found to weigh 6.1 grams. The product was diluted with 3 ml. of VM & P naphtha and designated Sample B.

Samples A and B and a sample of untreated Nalco 7171 were subjected to a compatibility test with surfactant that was supplied along with the sample of Nalco 7171. The surfactant had the designation "Activator" and is a nonionic surfactant of the polyethylene oxide condensate type. The compatibility test consisted of adding 2 ml of sample to a vial followed by 0.08 ml of activator and then mixing. The samples were then observed over a two month period. The results were as follows:

| Material | Appearance |
|---|---|
| Original Nalco 7171 | Coagulation in two minutes |
| Sample A | Coagulation in seven minutes |
| Sample B | No coagulation observed over a two month inspection period |

EXAMPLE 2

Part A. A 500 gram portion of 10% polyacrylamide gel (0.703 monomer mole) is placed in a jacketed sigma mixer. This polyacrylamide has an intrinsic viscosity of 12.6 measured in 1 normal NaCl at 25° C. Heat is applied to the jacket to bring the polymer mass to 50° C and mixing is started. The reaction mixture is buffered on the alkaline side by addition of 5 g. of $Na_2HPO_4.2H_2O$ and 8 g. of $Na_3PO_4.10H_2O$. This is followed by 14.2 g. of 37% formaldehyde solution (0.176 mole). The temperature is held at 50° C with mixing for 80 minutes, after which 20 g. of a 40% dimethylamine solution (0.176 mole) is added and the temperature raised to 75° C and held for 30 minutes. A sample of the aminomethylated polyacrylamide is dissolved in 1 normal NaCl for determination of its intrinsic viscosity which is found to be 9.8.

Part B. A 30% polyacrylamide latex is prepared by the technique of Vanderhoff and found to have an intrinsic viscosity of 11.9. The composition of the latex is as follows:

| | % |
|---|---|
| Polyacrylamide | 30 |
| Water | 38 |
| Paraffinic Solvent (Isopar M) | 28 |
| Brij 92 (polyoxyethylene (2) oleate) | 4 |

In a 500 ml three neck round bottom flask equipped with a stirrer is placed 166.5 g. of the above latex (50 g. polyacrylamide, 0.703 monomer mole). Stirring is started and the latex is heated to 50° C after which an emulsion composed of the following is added

Step 1

| | Grams |
|---|---|
| $Na_2HPO_4.2H_2O$ | 1.5 |
| $Na_3PO_4.10H_2O$ | 3.0 |
| 37% formaldehyde | 14.2 (0.176 moles) |
| Water | 15.0 |
| Isopar M | 12.0 |
| Brij 92 | 1.4 |

After 90 minutes at 50° C, 29.1 g. of the following emulsion is added:

Step 2

| | Grams |
|---|---|
| 40% dimethylamine | 20 (0.176 mole) |
| Isopar M | 8 |
| Brij 92 | 1.7 |

The latex is then heated to 75° C for 30 minutes, after which a sample is dissolved in 1 normal NaCl containing 0.04% Triton X-100 for determination of the intrinsic viscosity of the aminomethylated polyacrylamide, which is found to be 11.5.

EXAMPLE 3

A 20 g. sample of Nalco 7171 is given the same drying treatment as Sample B in Example 1. Gaseous ammonia is passed in over the stirred mixture so as to create saturation. The ammonia atmosphere is then maintained over a 4-hour period with stirring at 85° C. The product is then blown with air to remove ammonia vapor. A solution of the polymer shows strongly anionic behavior.

EXAMPLE 4

Part A. A 5 g. sample of polyacrylamide (0.703 monomer mole) having a molecular weight of about 6 million is dissolved in water to give a 5% solution. This solution is heated to 85° C and 2.26 g. of 37% NaOH is added (0.022 mole). The base is mixed into the viscous mass, the reactor is closed, and the mixture is heated at 85° C for 6 hours.

Part B. This experiment is carried out as in Part A except that instead of NaOH, 1.01 g. of 37% ammonia (0.022 mole) is used. The neutralized polymer has improved properties with respect to the polymer produced in Part A.

EXAMPLE 5

Polyacrylamide having a weight average molecular weight of 3 million is made up as 3% solution containing 30 grams of polyacrylamide (0.4222 monomer mole) and 970 grams of water. To this solution is added 3 grams of $Na_2PO_4.2H_2O$, 5 grams of $Na_3PO_4.10H_2O$ and 3.4 grams of 37% formaldehyde (0.042 mole). The reaction mixture is held at 45° – 50° C for 80 minutes, after which 4.8 grams of 40% dimethylamine solution (0.042 mole) is added. The temperature is then raised to 75° C and held for 30 minutes. The mixture is cooled and designated Product A.

An emulsion formed from 100 grams of Product A, 96 grams of Low Odor Paraffin Solvent (Exxon) and 4 grams of Brij 92 (polyoxyethylene(2)oleate) is placed in a 500 ml round bottom flask and attached to a rotary vacuum evaporator that is fitted with a dip tube that can be used to feed or withdraw material from the evaporator.

Concentration is carried out at a pressure of 40 millimeters of mercury over the temperature range of 40° – 80° C. As the amount of water taken overhead reaches approximately 80 ml the contents of the evaporator are removed and emulsified with another 100 ml of Product A. The hydrocarbon taken overhead is separated and returned to the emulsion. The new emulsion is returned to the evaporator and the cycle is repeated until all of Product A is concentrated to a stable latex containing

|  | Grams |
|---|---|
| Aminomethylated polyacrylamide | 33 |
| Water | 17 |
| Low Odor Paraffin Solvent | 96 |
| Brij 92 | 4 |

A 4 gram sample of the above latex is added with stirring to 600 ml of water containing 0.04% Triton X-100. The polymer dissolves within 10 minutes to give a solution of aminomethylated polyacrylamide.

EXAMPLE 6

A mixture of 287 grams (9.24 moles) of methylamine (755 grams of 37% aqueous solution), 400 grams of Low Odor Paraffin Solvent and 50 grams of Brij 92 is emulsified by passage through a Manton Gaulin Homogenizer. The emulsion is placed in a 5 liter flask provided with a stirrer, condenser, thermometer, and cooling bath, and 850 grams (9 moles) of epichlorohydrin is added over a 2 hour period at 40° – 45° C. Next, 450 grams of 50% aqueous NaOH (4.5 moles) is emulsified with 250 grams of Low Odor Paraffin Solvent and 20 grams of Brij 92 and added over a one hour period with the temperature held at 70°–80° C. Heating is continued for 1 hour at 60° C. The product is a free flowing, non-viscous liquid that is readily dissolved in water by use of a water soluble surfactant.

EXAMPLE 7

A 100 gram sample of Nalco 7171 is dried by the same process as described for Example 1, Sample B, and the dried latex particles are centrifuged to remove hydrocarbon and then air dried at 50° C to drive off the remaining traces of hydrocarbon. The product is a fine white powder.

EXAMPLE 8

Self-Dissolving Compositions

The following latices are prepared according to the methods described by Vanderhoff, U.S. Pat. No. 3,284,393, and dried to a polymer/water ratio of 90/10 and a polymer to mineral oil ratio (ISOPAR-M of 1:1 by the method of the present invention. Surfactant is added to the dried suspension, after which the mixture is added to stirred water in such proportions as to give a polymer concentration of 0.4%. The water thickness almost immediately and reaches maximum viscosity in most cases within 20 – 40 minutes, which indicates that the polymer has dissolved in the water.

| Polymer | Surfactant Identity | Weight % of Surfactant in Total Composition |
|---|---|---|
| Acrylamide | (1) | 7% |
| " | (3) | 6% |
| " | (4) | 11% |
| Acrylic Acid | (1) | 6% |
| " | (3) | 5% |
| " | (4) | 10% |
| Acrylic acid/acrylamide 30/70 | (1) | 6% |
| " | (3) | 5% |
| " | (4) | 10% |
| " | (7) | 12% |
| " | (8) | 4% |
| Dimethylaminoethyl methacrylate | (1) | 6% |
| " | (2) | 6% |
| " | (3) | 5% |
| " | (6) | 10% |
| Sulfomethyl acrylamide | (1) | 6% |
| " | (2) | 6% |
| " | (5) | 10% |
| Dimethylaminomethyl acrylamide | (2) | 6% |
| " | (3) | 6% |
| " | (6) | 10% |
| Methylamine/epichlorohydrin 1/1.2 | (2) | 6% |
| " | (3) | 6% |
| " | (6) | 10% |

|  | HLB |
|---|---|
| 1 POE (10) cetyl ether (Brij 56) | 12.9 |
| 2 POE/POP (Pluronic P104) | 13.0 |
| 4 POE (12) nonylphenol (Surfonic N120) | 14.1 |
| 4 Sodium dioctyl sulfosuccinate (Aerosol-OT) | 13.5 |
| 5 Ammonium alkyl aromatic sulfonate (Cresterge-K) | 13.0 |
| 6 Tetradecyl trimethyl ammonium chloride | not reported in literature |
| 7 Polyethylene glycol ether of linear alcohol (Tergitol 15S5) | 10.5 |
| 8 Polyethylene glycol ether of linear alcohol Tergitol 15 S 15 | 10.4 |

EXAMPLE 9

Sulfomethylation

A polyacrylamide (PAM) latex is prepared having the following composition:

A

|  | Parts |
|---|---|
| PAM | 30 |
| Water | 39 |
| Mineral Oil (ISOPAR M) | 28 |
| Sorbitan mono-oleate emulsifier (Span 80) | 3 |

The water is evaporated from this latex at temperatures below 60° C to give a dried product of the following composition:

B

|  | Parts |
|---|---|
| PAM | 30 |
| Water | 3 |
| Isopar M | 28 |
| Span 80 | 3 |

To 65 g of B is added with vigorous stirring in a closed reactor:
1. 7.5 g of a 40% solution of NaHSO$_3$ whose pH has been adjusted to 12.0 with Na$_3$PO$_4$, and
2. 1.2g of formaldehyde.

The mixture is then heated with stirring to 50°–55° C and held at this temperature for 4 hours.

The reaction product is dissolved in water containing 0.04% Tergitol 15S9 surfactant (Polyethylene glycol ether of linear alcohol, HLB 13.3) to give a 0.4% solution of polymer. Polymer is precipitated for analysis by adding the aqueous solution to ethanol. The polymer shows a 7 mole percent substitution of sulfomethyl groups.

EXAMPLE 10

Hoffman Reaction

A sample of the latex from part B of Example 2 is dried by vacuum evaporation at temperatures below 80° C to give the following composition:

A

|  | Grams |
|---|---|
| PAM | 30 |
| Water | 3 |
| Isopar M | 28 |
| Polyoxyethylene (2) oleate | 4 |

A 200 ml bottom flask is provided with a stirrer, thermometer, gas inlet and outlet. To it is added A, which is then cooled to −20° C. Chlorine is passed in over a 1 hour period with stirring to give a total of 0.04 mole of $Cl_2$. The temperature is raised to 30° C over a 2 hour period and held at 30° C for another hour. At this time, caustic emulsion B is added with vigorous stirring:

B

|  | Grams |
|---|---|
| Isopar M | 10.0 |
| NaOH | 3.2 |
| Water | 6.0 |
| Polyoxyethylene (2) oleate | 1.0 |

Stirring is continued for 30 minutes at 30° C after which the mixture is allowed to stand at 30° for 4 hours. The mixture is then dried to a polymer/water ratio of 95/5 by stripping under vacuum at 30°-45°. Polyoxyethylene (10) cetyl ether (6g) is added to the suspension and mixed in. The product dissolves rapidly in water and analysis of recovered polymer shows amino nitrogen.

EXAMPLE 11

A sample of latex prepared as (A) of Example 10 is treated as follows:

To 62 g of A is added 0.045 mole of 3-(dimethylamino)propylamine. The mixture is heated and stirred at 100° C for 2 hours under vacuum to speed the release of ammonia.

The product is cooled and a sample is treated with 10 wt % of polyoxyethylene (10) cetyl ether. This treated sample dissolves readily in water to give a 0.4% polymer solution that when added to a dilute slurry of paper fibers makes these fibers strongly cationic.

EXAMPLE 12

An emulsion is prepared having the following composition:

| | | % | Grams | Moles |
|---|---|---|---|---|
| Aqueous phase | water | 54.6 | 220 | |
| | dimethylamine | 11.2 | 45 | 1 |
| | $Na_2CO_3$ | 34.2 | 138 | 1.3 |
| | | 100.0 | 403 | |
| Oil | 1,2 dibromoethane | | 187.9 | 1 |
| | Isopar M | | 100 | |
| | (Brij 92 (Polyoxyethylene | | | |

| Phase | | % | Grams | Moles |
|---|---|---|---|---|
| | (2) oleyl ether) | | 5 | |
| | Brij 72 (Polyoxyethylene (2) stearyl ether) | | 15 | |

The above emulsion is formed by passing the mixture through a homogenizer at 60° C and from there into a closed reactor provided with agitation, temperature and pressure recording and temperature control.

The emulsion is held at 60° for 8 hours and is then cooled to 50° C and dried under vacuum at 50° to a polymer/water ratio of 95/5. To the product is added 10 wt % of polyoxyethylene (10) cetyl ether. The resultant mixture is a stable suspension that dissolves readily when added to water togive a 0.5% solution. The aqueous solution, when added to a dilute suspension of cellulose pulp, makes the fibers strongly cationic.

EXAMPLE 13

A copolymer latex dried by the method of this patent application and having composition A

| | A | Grams |
|---|---|---|
| Solid Phase | copolymer of acrylamide/ dimethylaminoethyl methacrylate 80/20 | — |
| | water | 30 |
| | | 3 |
| Oil Phase | Isopar M | 20 |
| | Span 80 | 3 | is treated in a closed system under pressure with a 4.4 g of methyl bromide for a period of 8 hours at 50° C. The reaction mixture is cooled and to it is added 10 wt % of polyoxyethylene (10) cetyl ether. The resultant mixture dissolves readily in water to give a 0.4% solution of polymer that when added to a dilute slurry of cellulose fibers make these fibers strongly cationic.

EXAMPLE 14

A copolymer latex dried by the method of this patent application and having composition A

| | A | E |
|---|---|---|
| Solid Phase | copolymer of acrylamide/ vinyl bromide; 90/10 | 30 |
| | water | 3 |
| Oil Phase | Isopar M | 20 |
| | Span 80 | 3 | is treated in a closed system with 2.7g of trimethylamine at 50° for 8 hours. The reaction mixture is cooled and to it is added 10 wt % of polyoxyethylene (10) cetyl ether. The resultant mixture dissolves readily in water to give a 0.4% solution of polymer that when added to a dilute slurry of cellulose fibers makes these fibers strongly cationic.

EXAMPLE 15

A polyacrylamide latex was prepared and vacuum dried to give composition (A) below.

| | % |
|---|---|
| PAM | 22.1 |
| Moisture | 2.0 |
| Hydrocarbon | 75.9 | to 20 parts of A was added with stirring the following:

|  | Parts |
|---|---|
| Mineral spirits | 10 |
| Polyoxyethylene (2) oleyl ether | 2 |
| 20% NaOH in Methanol | 1 |

The resulting mixture was stirred at 30° C for 27 hours, at which time $NH_3$ evolution had ceased. Carboxyl content of the resulting polymer was 6.6 mole %.

EXAMPLE 16

To 20 parts of composition A of Example 15 was added the following:

|  | Parts |
|---|---|
| Mineral spirits | 40 |
| Polyoxyethylene (2) oleyl ether | 8 |
| 20% NaOH in Methanol | 4 |

The resulting mixture was stirred for 52 hours and heated to 50° C for the last hour. Carboxyl content of the resulting polymer was 22 mole %.

The present invention is particularly advantageous in that by proceeding in accordance with the invention, it is possible to produce water soluble polymers dispersed in oil which are stable to coagulation or agglomeration when subjected to subsequent treatment.

In accordance with the present invention, it is possible to provide self dissolving polymer compositions by addition of a surfactant, to a composition of water soluble polymer dispersed oil, without the polymer agglomeration or coagulation which would occur without proceeding in accordance with the invention.

Furthermore, the present invention offers the advantage that various water soluble polymers can be chemically modified, without the disadvantages inherent in attempting to modify such polymers, in particular, those of high molecular weight, by ordinary techniques.

As still another advantage, amine condensation polymers can be produced without limiting the polymer concentrations as heretofore required in the art.

Numerous modifications and variations of the present invention are possible in light of the above teachings and, therefore, within the scope of the appended claims, the invention may be practised otherwise than as particularly described.

What is claimed is:

1. A self water dissolving composition of a water soluble polymer dispersed in oil which is stable to polymer coagulation and agglomeration, comprising:

a water soluble polymer dispersed in oil, said polymer having a water content at which the polymer remains finely divided and dispersed in the oil, said water content being less than 40%, by weight, based on polymer and water, said water soluble polymer dispersed in oil having been prepared from a water in oil emulsion of said water soluble polymer by reduction of the water content thereof; and a water soluble surfactant, having an HLB number of above 8 in an amount effective to render the water soluble polymer self dissolving in water.

2. The composition of claim 1 wherein said water content is from 1% to 30%, by weight, of water based on polymer and water.

3. The composition of claim 2 wherein the water content is from 1% to 15%, by weight, of water, based on polymer and water.

4. The composition of claim 3 wherein the polymer is an ethylenically unsaturated addition polymer.

5. The composition of claim 4 wherein the surfactant is present in an amount of from about 0.1% to about 20%, by weight, based on oil.

6. The composition of claim 5 wherein the polymer dispersed in oil is prepared from a water in oil emulsion containing from about 50% to about 95%, by weight, water, based on polymer and water.

7. The composition of claim 6 wherein the polymer has a molecular weight of at least 100,000.

8. The composition of claim 7 wherein the polymer is an acrylamide polymer.

* * * * *